(12) United States Patent
Watanabe

(10) Patent No.: US 7,453,417 B2
(45) Date of Patent: Nov. 18, 2008

(54) DISPLAY SYSTEM HAVING PROCESSOR FOR ACCESSING DATA FROM STACKED DISPLAY DEVICES AND DISPLAY METHOD THEREOF

(75) Inventor: Gaku Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 685 days.

(21) Appl. No.: 11/012,386

(22) Filed: Dec. 14, 2004

(65) Prior Publication Data

US 2005/0128492 A1 Jun. 16, 2005

(30) Foreign Application Priority Data

Dec. 15, 2003 (JP) .............................. 2003-416734

(51) Int. Cl.
 *G09G 5/00* (2006.01)
(52) U.S. Cl. ....................................................... 345/1.1
(58) Field of Classification Search ................. 345/1.1, 345/2.2; 715/776
See application file for complete search history.

(56) References Cited

U.S. PATENT DOCUMENTS

| | | | |
|---|---|---|---|
| 6,972,732 B1 * | 12/2005 | Nishikawa ................... | 345/1.1 |
| 7,154,452 B2 * | 12/2006 | Nakamura et al. ........... | 345/1.1 |
| 7,249,324 B2 * | 7/2007 | Nakamura et al. ........... | 715/776 |
| 7,262,763 B2 * | 8/2007 | Kinjo .......................... | 345/173 |
| 2002/0105600 A1 * | 8/2002 | Shimoda et al. ............. | 348/739 |
| 2004/0104901 A1 * | 6/2004 | Capurso et al. ............. | 345/204 |
| 2004/0155833 A1 * | 8/2004 | Ishii et al. .................... | 345/1.1 |

FOREIGN PATENT DOCUMENTS

JP 2000-293120 A 10/2000

* cited by examiner

*Primary Examiner*—Sumati Lefkowitz
*Assistant Examiner*—Robert E Carter, III
(74) *Attorney, Agent, or Firm*—Canon USA Inc. IP Div

(57) ABSTRACT

A display device includes communication ports at its four corners. A data processor includes a communication port which can be connected to one of the communication ports of the display device. In a state where the data processor is in connection with the display device, the data processor reads data stored in the display device according to predetermined instructions of a user, performs processing according to the predetermined instructions, and transfers the processed data to the display device.

9 Claims, 13 Drawing Sheets

FIG. 1
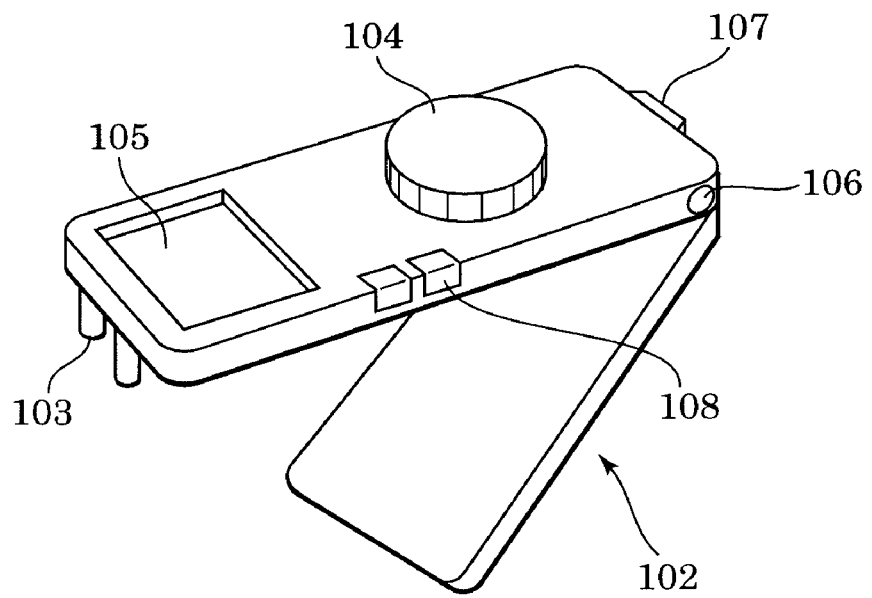
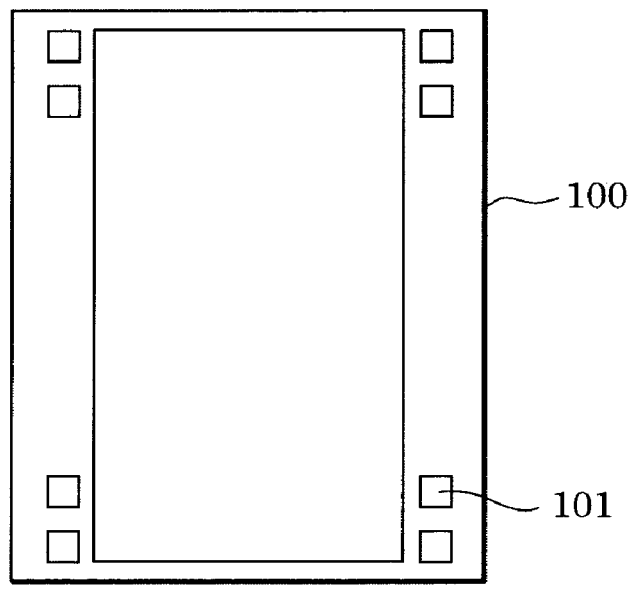

FIG. 13

| CDT | COH | TRANSFER-DESTINATION OF DATA IN AREA F | TRANSFER-DESTINATION OF DATA IN AREA R | TURN |
|---|---|---|---|---|
| 3 | 3 | F | R | NOT TURNED |
| 3 | 2 | F | R | TURNED |
| 3 | 7 | R | F | NOT TURNED |
| 3 | 6 | R | F | TURNED |
| 2 | 3 | F | R | TURNED |
| 2 | 2 | F | R | NOT TURNED |
| 2 | 7 | R | F | TURNED |
| 2 | 6 | R | F | NOT TURNED |
| 7 | 3 | F | R | NOT TURNED |
| 7 | 2 | F | R | TURNED |
| 7 | 7 | R | F | NOT TURNED |
| 7 | 6 | R | F | TURNED |
| 6 | 3 | F | R | TURNED |
| 6 | 2 | F | R | NOT TURNED |
| 6 | 7 | R | F | TURNED |
| 6 | 6 | R | F | NOT TURNED |

FIG. 14

| COH | TRANSFER-DESTINATION OF DATA IN AREA F OF FROM | TRANSFER-DESTINATION OF DATA IN AREA R OF FROM | TURN |
|---|---|---|---|
| 3 | F | R | NOT TURNED |
| 2 | F | R | TURNED |
| 7 | R | F | NOT TURNED |
| 6 | R | F | TURNED |

DISPLAY SYSTEM HAVING PROCESSOR FOR ACCESSING DATA FROM STACKED DISPLAY DEVICES AND DISPLAY METHOD THEREOF

BACKGROUND OF THE INVENTION

1. Field of the Invention

The present invention relates generally to display systems and more specifically to display systems that include a plurality of display devices.

2. Description of the Related Art

Thin display devices such as liquid crystal display panels and EL panels are now being offered as alternatives to information on paper particularly for browsing or distributing large amounts of information (e.g. in conferences). The advantage is that large amounts of information can easily be displayed while reducing costs associated with paper use. That is, costs for paper and consumables such as ink and toner can be reduced.

In order to distribute data, thin display devices are connected by cables to a general-purpose computer containing the data, and then the data is transferred from the computer to the thin display devices. Alternatively, the data to be distributed is transferred to a memory card, and the memory card is connected to the thin display devices so as to directly display the data in the thin display devices, or the data is further transferred from the memory card to the thin display devices so as to display the data.

However, the above-described method has the following problems. That is, the conventional thin display device transfers data while being connected to a personal computer or via a memory card. Therefore, a complicated operation must be performed on the personal computer. Also, the display device must be used in conjunction with the personal computer, which causes poor portability, and thus such display device cannot be easily used as an alternative of paper. Compared to a method using paper and a copier, the cost of consumables reduces in the method using display devices. However, when paper is used, documents must be copied again if the described content is changed. Further, when the order of sheets needs to be changed or the vertical direction of the document must be changed, all the sheets must be sorted again. Therefore, the method using paper is poor in convenience and usability when the amount of data is large.

SUMMARY OF THE INVENTION

The present invention has been made in view of the above-described problem, and provides a display system including thin display devices which can be used as an alternative to paper in an environment where a large amount of paper is used for distributing and browsing information, such as in conferences or paperwork.

A display system according to the present invention includes a display device including a first communication unit, an image memory, and a display unit which displays images stored in the image memory; and a data processor including an operation unit, a second communication unit which can be connected to the first communication unit of the display device, and a memory. In a state where the data processor is in connection with the display device, the data processor reads data stored in the image memory of the display device into the memory according to predetermined instructions of a user, performs processing according to the predetermined instructions, and transfers the processed data to the image memory of the display device.

Also, the present invention provides a display method for the display system.

According to the present invention, a highly convenient display system of a simple configuration which can be used as an alternative to paper can be provided at a low cost.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 shows a display device according to an exemplary embodiment of the present invention.

FIG. 13 shows the correspondence among CDT, COH, a transfer-destination of data in area F, and a transfer-destination of data in area R according to an embodiment of the present invention.

FIG. 14 shows an example of transferring data to each of display devices D1 to D3 according to COH according to an embodiment of the present invention.

DETAILED DESCRIPTION OF THE EMBODIMENTS

Figure 2A:
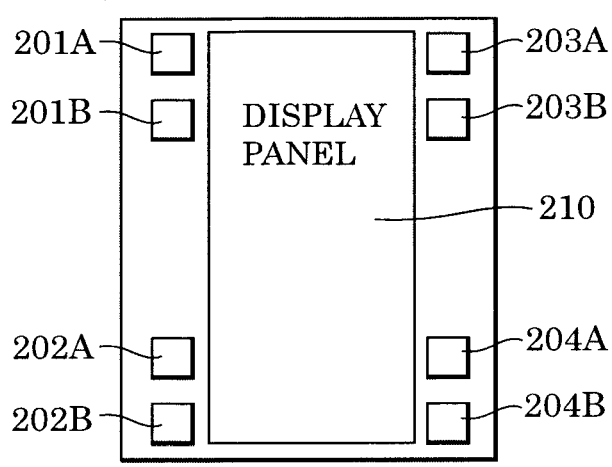
FIGS. 2A to 2C are a front view, a back view, and a side view, respectively, of a display device 100 according to an embodiment of the present invention.

Embodiments of the present invention will be described in detail in accordance with the accompanying drawings.

First Embodiment

FIG. 1 schematically illustrates the configuration of an embodiment of the present invention. Reference numeral 100 denotes a display device, the front and back surfaces thereof having a thin liquid crystal display panel; 101 denotes a communication port, which is composed of a pair of terminals, disposed at four corners of the front and back surfaces of the display device 100; 102 denotes a data processor; 103 denotes a first communication port (COM1) of the data processor 102; 104 denotes an operation dial; 105 denotes a compact liquid crystal display; 106 denotes a hinge; 107 denotes a second communication port (COM2) used for communicating with a system other than the display device 100, such as a personal computer or memory card containing image data to be displayed; and 108 denotes a mode selector switch.

Figure 2C:
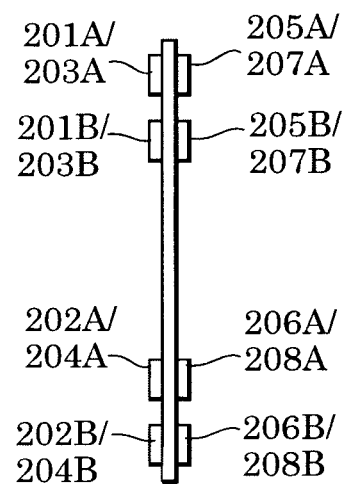
Figure 2B:
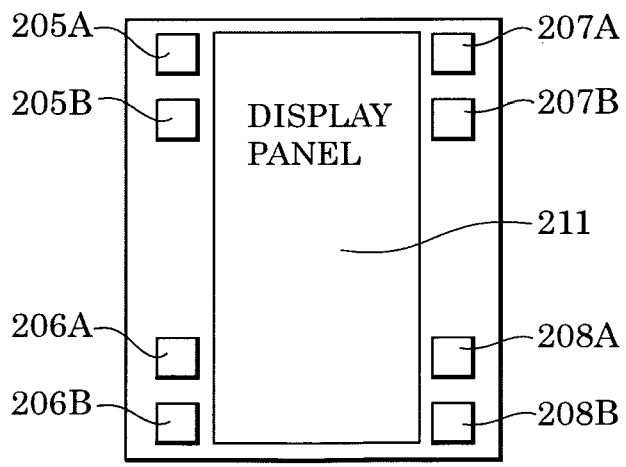

FIGS. 2A to 2C show a front view, a back view, and a side view, respectively, of the display device 100 of FIG. 1. The display device 100 includes liquid crystal display panels 210 and 211 on the front and back surfaces thereof, respectively, and the communication port 101 (FIG. 1) composed of a pair of terminals is provided at each of the four corners of the front and back surfaces for a total of eight (8) terminals.

More specifically, communication ports 201A-201B, 202A-202B, 203A-203B, and 204A-204B are disposed on the front surface of the display device 100. Likewise, communication ports 205A-205B, 206A-206B, 207A-207B, and 208A-208B are disposed on the back surface of the display device 100.

As shown in FIG. 2C, the communication ports at the corners of the front and back surfaces of the display device 100 are not integrated and are electrically separated.

In the following description, the communication ports 201A-201B, 204A-204B, 205A-205B, and 208A-208B are not used. However, a user can freely select a communication port to be used. Communication ports may be freely added or omitted based on the application and system configuration.

Figure 3:
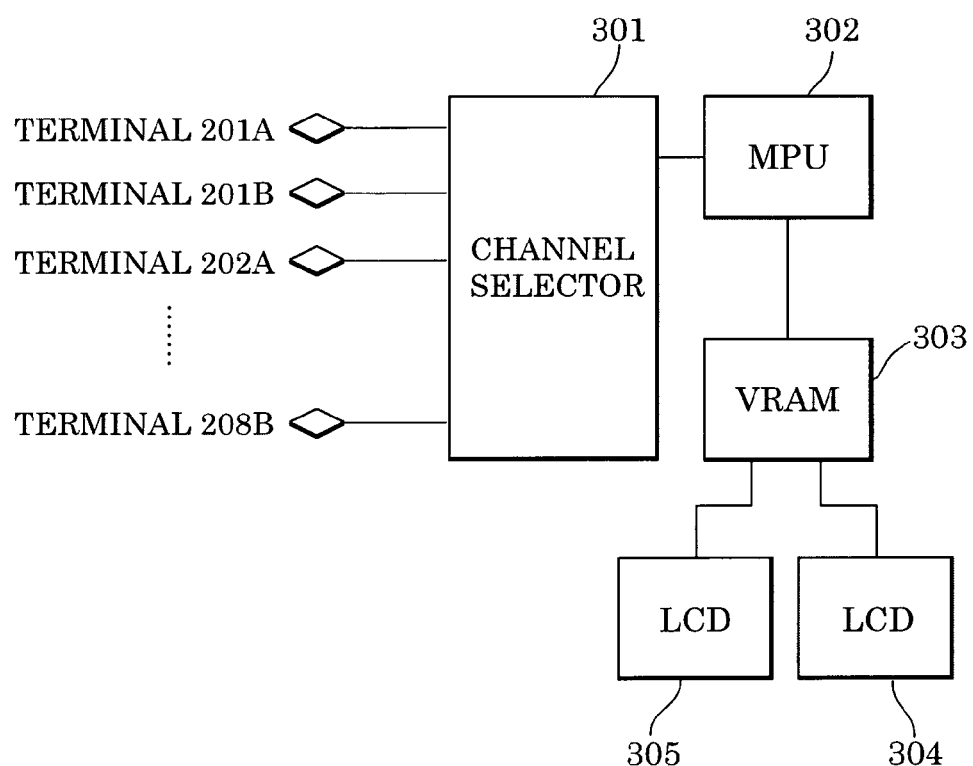
FIG. 3 is a block diagram showing a schematic configuration of the display device of FIGS. 2A to 2C.

FIG. 3 is a block diagram showing a schematic configuration of the display device 100. The terminals 201A, 201B, 202A, . . . , and 208A (FIG. 2A) of the communication ports are connected to a channel selector 301. The communication ports 201A-201B, 202A-202B, 203A-203B, and 204A-204B provided on the front surface and the communication ports 205A-205B, 206A-206B, 207A-207B, and 208A-208B provided on the back surface of the display device 100 are assigned to communication channels 1 to 8, respectively. The channel selector 301 detects an online channel among the eight communication channels and selects the channel as a communication channel.

An MPU 302 includes a readable/writable nonvolatile memory (RAM) containing a program and the identification number IDD of the display device 100, and controls the channel selector 301 and a video memory (VRAM) 303. The VRAM 303 is a readable/writable nonvolatile video memory and holds data displayed in thin liquid crystal displays (LCDs) 304 and 305.

Each of the LCDs 304 and 305 includes a display driving circuit therein. The LCD 305 corresponds to the liquid crystal display panel 210 on the front surface and the LCD 304 corresponds to the liquid crystal display panel 211 on the back surface. The VRAM 303 holds image data displayed on the LCDs 304 and 305 as dot-sequential pixel data.

Figure 4:
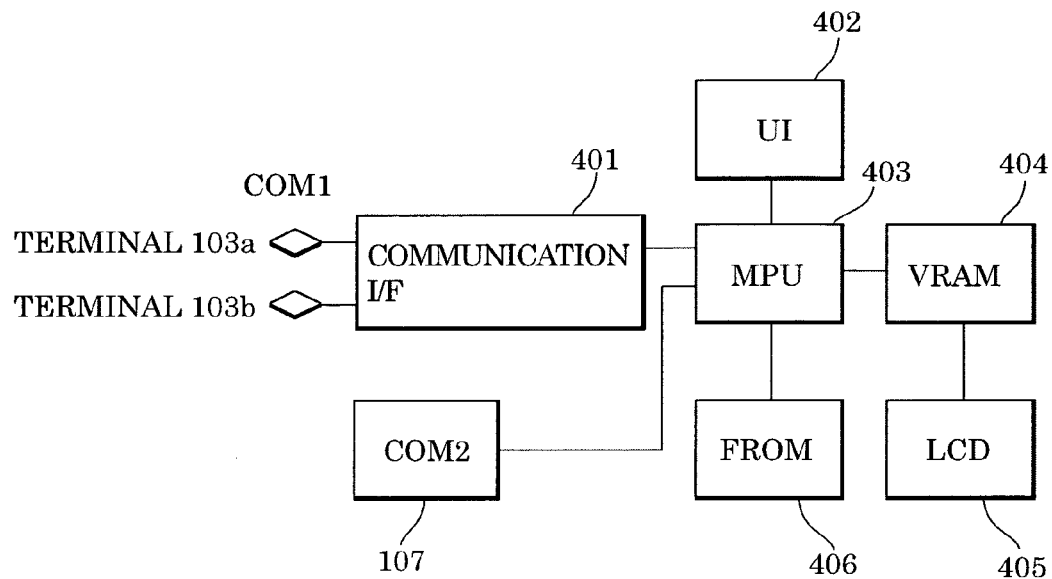
FIG. 4 is a block diagram showing a schematic configuration of a data processor according to an embodiment of the present invention.

FIG. 4 is a block diagram showing a schematic configuration of the data processor 102 of FIG. 1. The first communication port 103 (FIG. 1) of the data processor 102 includes a pair of terminals 103a and 103b, each being bar-shaped and protruded. The terminals 103a and 103b are connected to a data processor (MPU) 403 through a communication interface (I/F) 401. The MPU 403 operates according to a program stored in a flash memory (FROM) 406. The FROM 406 is used also as a data area and holds data stored in the data processor 102. The user controls the MPU 403, that is, the data processor 102, by a user interface (UI) 402 so as to use the data processor 102.

As shown in FIG. 1, the data processor 102 can be folded by pivoting on the hinge 106. Specifically, the data processor 102 can be folded over the display device 100 so that the communication port 103 is electrically connected to any of the communication ports 101 of the display device 100. The data processor 102 includes a fold detection switch, which is turned on when the data processor 102 is folded. The fold detection switch is part of the UI 402. The UI 402 further includes the operation dial 104 and the mode selector switch 108.

The data processor 102 includes a compact liquid crystal panel (LCD) 405 for viewing data stored in the FROM 406 and a VRAM 404 for holding the contents displayed on the LCD 405. In this embodiment, the VRAM 404 has half the recording capacity of the VRAM 303. The user can check the state of the data processor 102 by looking at the LCD 405 when using the processor. The VRAM 404 holds image data as dot-sequential pixel data.

The communication port 107 can be connected to an external general-purpose computer. Image data recorded in the FROM 406 can be updated through the communication port 107.

Hereinafter, an operation for updating data displayed on one of the display panels of the display device 100, such as the display panel 210, by using the data processor 102, will now be described.

Figure 5:
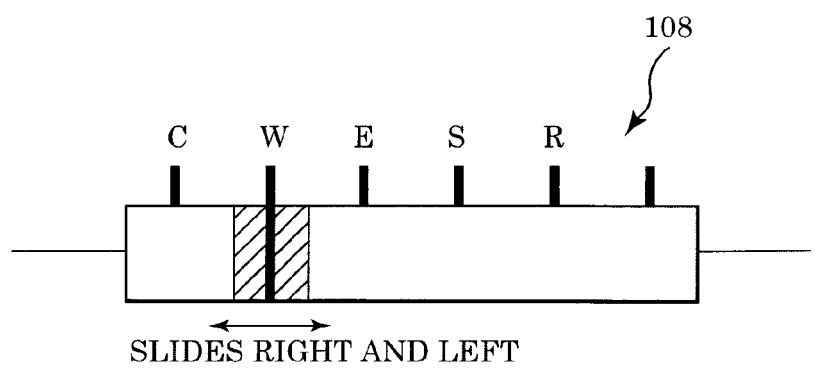
FIG. 5 illustrates a mode selector switch according to an embodiment of the present invention.

The user operates the mode selector switch 108 of the data processor 102 so as to set a write (W) mode. FIG. 5 is a side view of the mode selector switch 108, which has five positions of C, W, E, S, and R.

Position C corresponds to a copy mode. In the copy mode, an image displayed on the top display panel of a plurality of stacked display devices is copied to another display panel. Position W corresponds to a write mode. In the write mode, data stored in the data processor 102 is written into the display device. Position E corresponds to an erasing mode, which erases data stored in the display device. Position S corresponds to a sort mode, which sorts, according to page number, pieces of data corresponding to a document number in the data stored in the stacked display devices. Position R corresponds to a random mode, which randomly shuffles pieces of data in display devices and stores the data again.

The user selects image data to be written in the display device 100. By rotating the operation dial 104, information (name of file, for example) indicating the image data stored in the data processor 102 or a list thereof is displayed on the liquid crystal panel 105. The user stops rotating the operation dial 104 when an image to be selected is displayed on the liquid crystal panel 105.

Then, the communication port 101 of the display device 100 is connected to the communication port 103 of the data processor 102, when the data processor 102 is folded over. When any document or figure is being displayed in the display device 100, the communication port 103 of the data processor 102 is connected to the communication port 101 at the right shoulder of the display device 100 such that the top and bottom of the document or figure is correctly oriented and the surface is directed upward.

Then, the user provides instructions for transferring the selected image data to the display device 100 from the data processor 102 by operating the operation dial 104. According to the instructions, the data processor 102 then transfers the selected image data to the display device 100, and the display device 100 stores the image data therein and also displays the image data on the liquid crystal panel on the front surface.

Figure 6:
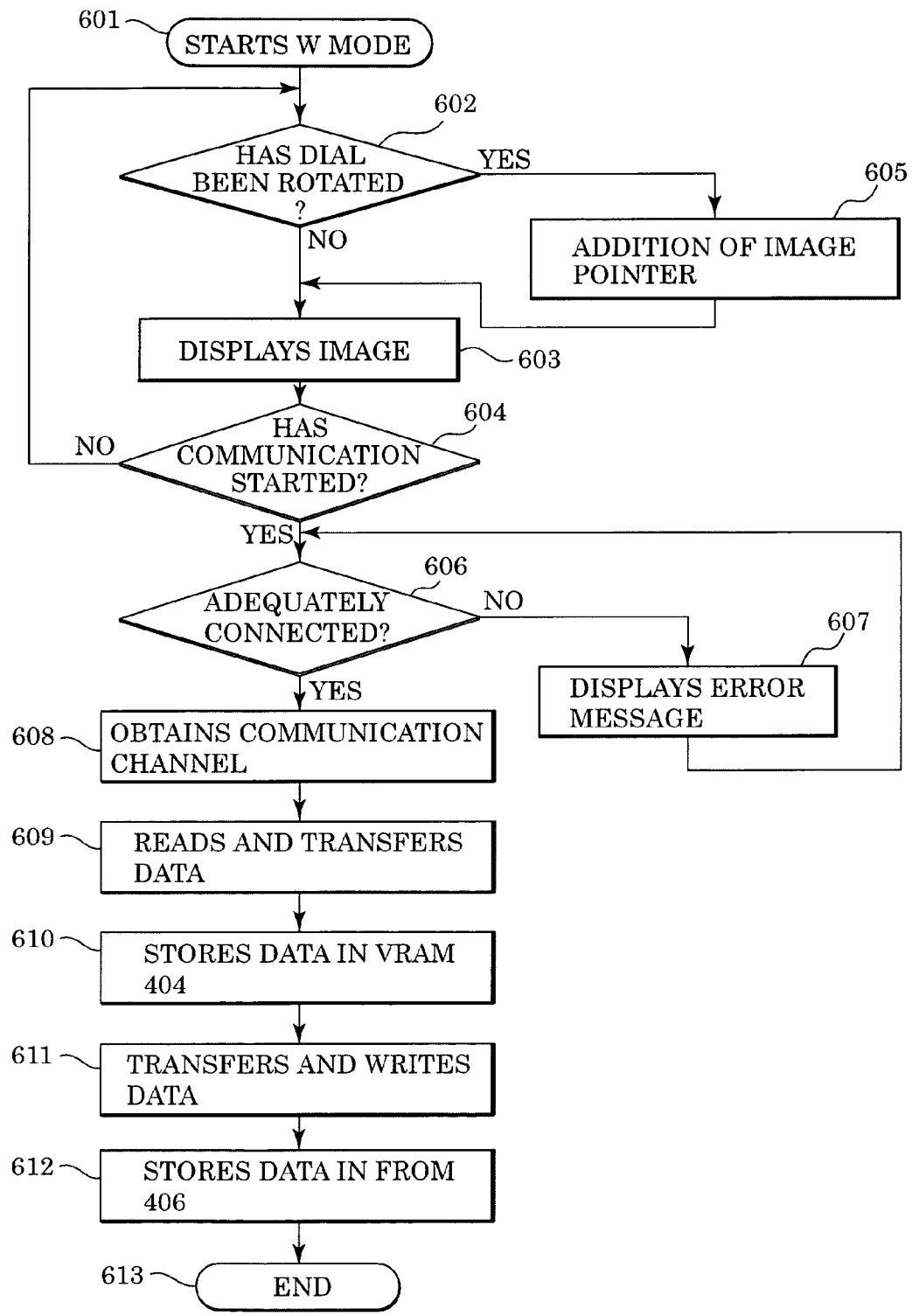
FIG. 6 is a flowchart of a write mode according to an embodiment of the present invention.

FIG. 6 is a flowchart illustrating the operation of the data processor 102 in the write mode. The FROM 406 stores an operation program for the MPU 403 according to the write mode, and the MPU 403 operates in the following manner according to this program.

First, the MPU 403 detects that the mode selector switch 108 of the UI 402 has been set to position W and then starts the W mode (601). The MPU 403 detects the rotation of the operation dial 104 of the UI 402 (602).

Figure 7:
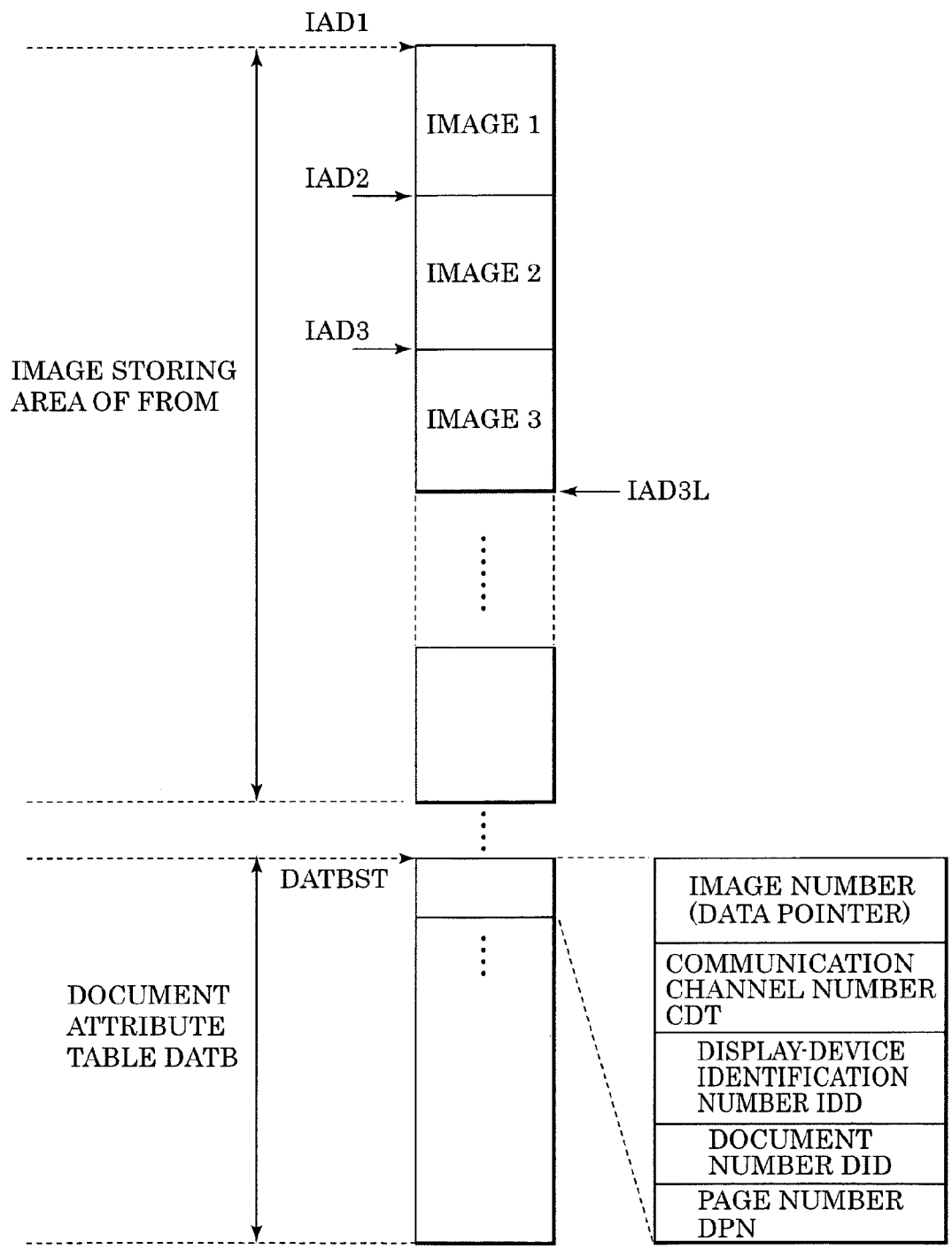
FIG. 7 is a memory map of an FROM according to an embodiment of the present invention.

If the dial is not rotated, the MPU 403 transfers the image written in the FROM 406 to the VRAM 404. The transferred image data is displayed on the LCD 405, so that the user can view the contents of the image data (603). FIG. 7 shows an example of a memory map of the FROM 406. In FIG. 7, three images are recorded in an image recording area of the FROM 406. In the image recording area, data pointers IAD1, IAD2, and IAD3 are provided for images 1 to 3, respectively.

When the operation dial 104 is rotated (602), the MPU 403 circularly selects the data pointer IAD1→IAD2→IAD3→IAD1 of the image to be transferred to the VRAM 404 (605), and transfers the corresponding image data to the VRAM 404 (603). When the operation dial 104 is reversed, the data pointers circulate in the opposite direction.

The data processor 102 can be folded with the hinge 106 being the center. When the user folds the data processor 102, the fold detection switch of the UI 402 is turned on. The fold detection switch is turned on when the communication port 101 of the display device 100 contacts the communication port 103 of the data processor 102 by folding the data processor 102 over the display device 100.

When the fold detection switch is turned on, the MPU 403 begins to communicate with the display device 100 (604).

The MPU 403 of the data processor 102 transmits a connection start signal STT to the display device 100 through the communication I/F 401 and the terminals 103*a* and 103*b* of the communication port 103 (604). If the connection cannot be adequately established and if an error occurs (606), the MPU 403 writes an error message into the VRAM 404 (607). Accordingly, the error message is displayed on the LCD 405 and the user can recognize communication failure.

The MPU 302 of the display device 100 uses the channel selector 301 so as to determine the channel to which the connection start signal STT has been input among the eight channels assigned to the communication ports 101, and transmits communication channel data CDT to the MPU 403 of the data processor 102 (608). The CDT is a number corresponding to one of the eight channels 1 to 8.

The MPU 403 of the data processor 102 reads an identification number IDD of the display device stored in the internal RAM of the MPU 302 of the display device 100, and then reads a part of data stored in the VRAM 303 (609). Image data corresponding to the LCDs 304 and 305 is stored in the VRAM 303. A part to be read depends on the channel data CDT obtained in step 608. Here, the data processor 102 is connected to the right shoulder of the display device 100, and thus the corresponding channel is 2, 3, 6, or 7. If another channel is obtained, the MPU 403 displays an error message on the LCD 405. Also, if the communication is interrupted during processing, the MPU 403 displays an error message on the LCD 405.

Figure 8:
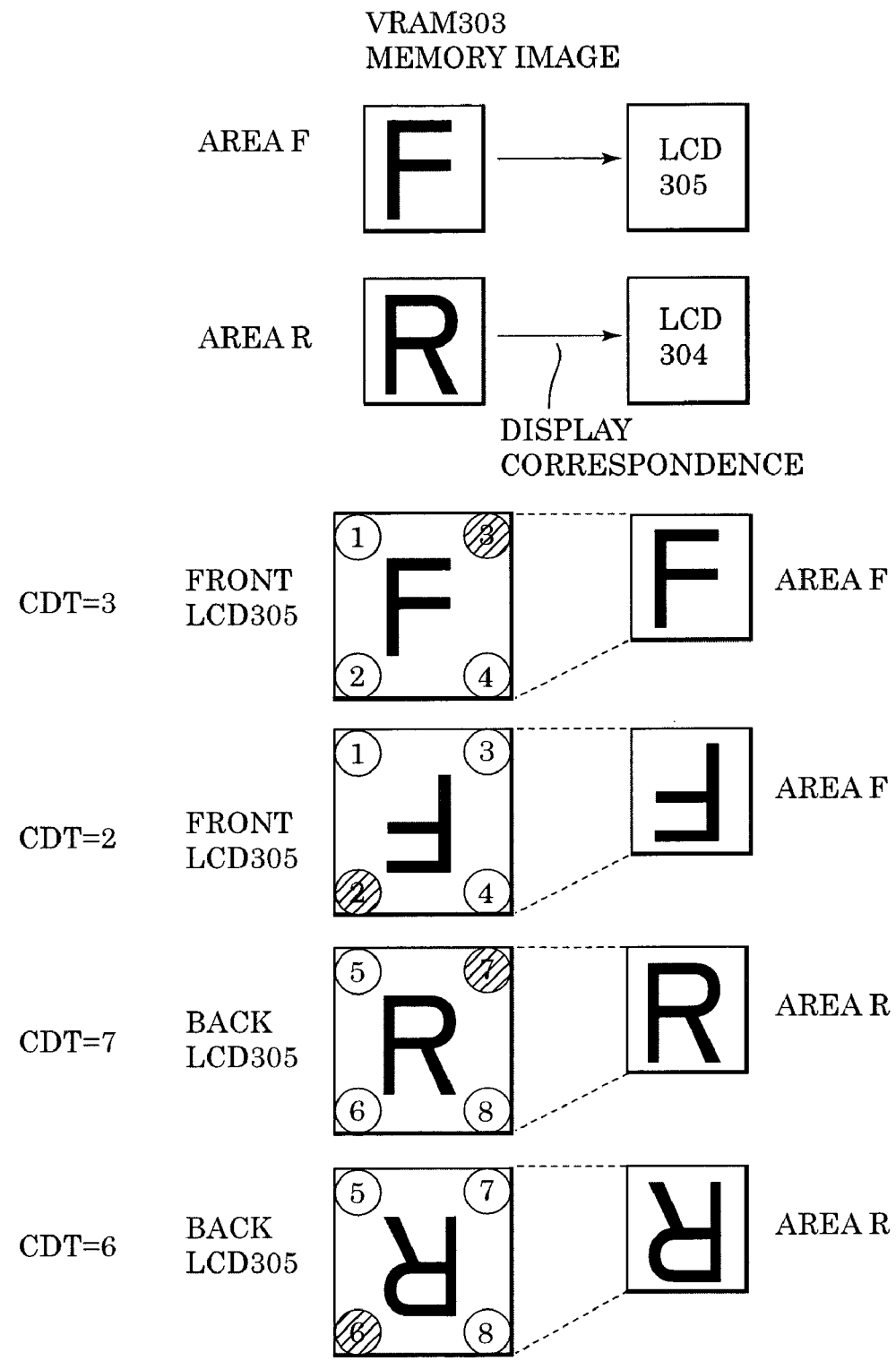
FIG. 8 shows the relationship between CDT and image areas according to an embodiment of the present invention.

FIG. 8 shows the display correspondence between a memory map of the VRAM 303 and the LCDs 305 and 304. The right shoulder (upper-right portion) of the display device for the user varies depending on displayed content. In FIG. 8, when CDT=3, the corner provided with the communication port 203A-203B corresponding to channel 3 is the right shoulder of the display device 100 for the user. When CDT=2, the corner provided with the communication port 202A-202B corresponding to channel 2 is the right shoulder (upper-right portion) of the display device 100 for the user. Accordingly, image data is recorded with a 180-degree turn according to the above-described correspondence in areas F and R of the memory map of the VRAM 303.

When CDT is 2 or 3, the MPU 302 transfers the data in area F of the VRAM 303 to the MPU 403. On the other hand, when CDT is 6 or 7, the MPU 302 transfers the data in area R to the MPU 403.

Herein, assume that CDT=6. In this case, the display panel 211 (FIG. 2B) of the display device 100, that is, the LCD 304 is regarded as a front surface for the user. Further, the user uses the display panel 211 with a 180-degree change from the position shown in FIG. 2B.

The MPU 403 stores the transferred data in the VRAM 404. Also, the MPU 403 stores IDD obtained by communicating with the MPU 302 in an internal register. Since the same data is displayed on the LCD 405, it appears to the user as if the data in the display device 100 has been copied to the data processor 102 after the transfer. If an error occurs during the transfer, the process returns to step 609.

The MPU 403 transfers image 3 in FIG. 7 to the MPU 302 of the display device 100 through channel 6 (611). The MPU 403 transmits a write start signal STW to the MPU 302, reads data in the reverse order from the data pointer IAD3L in the FROM 406, and transmits the data to the MPU 302. The MPU 302 receives the data and writes the data as dot-sequential data in area R of the VRAM 303. The data pointer IAD3L is the end address of pixel data forming image data 3. Since the image data is recorded as dot-sequential pixel data, the data read from IAD3L is written in area R of the VRAM 303 by the MPU 302 with a 180-degree turn. With this operation, the user can view the data in a positionally correct state without turning the display device 100.

When CDT is 6 or 7, the MPU 403 reads image data in the reverse order from the end address, as described above. On the other hand, when CDT is 2 or 3, the MPU 403 reads the image data from the start address. If an error occurs during a transfer operation, the process returns to step 611.

Then, the MPU 403 writes the data recorded in the VRAM 404 into the area where image 3 is recorded of the FROM 406 shown in FIG. 7 (612). Then, the LCD 405 displays a message indicating that "data has been transferred" after UI data is written to VRAM 404 by the MPU 403. Accordingly, the user is notified of completion of transfer.

The MPU 403 writes the display-system identification number IDD stored in the internal register in step 610 and the correspondence of the data pointer IAD3 obtained in step 604 in a document attribute table DATB in the FROM 406. An example of the contents of DATB is shown in FIG. 7. DATB is a group of data tables including addresses of image data recorded in the FROM 406, communication channel number CDT, display-system identification number IDD, document number DID, and page number DPN. DID and DPN will be explained with reference to the second embodiment of the present invention, described below. By referring to DATB, the data processor 102 can determine that a held image corresponds to a display panel of a particular display device.

Then, the write mode is completed (613).

Second Embodiment

Next, the second embodiment of the present invention will be described. In the second embodiment, three display devices are used.

First, an operation in the copy mode will be described. By using the copy mode, the user can easily copy the contents displayed in a display device facing the user to another of stacked display devices. A specific operation will be described below.

First, the user sets the mode selector switch 108 of the data processor 102 to the C mode (copy mode). Then, the user rotates the operation dial 104 so as to select a display device as a source by referring to the LCD 405. If the user does not select any display device, the top display device of the stacked display devices is selected.

Figure 9:
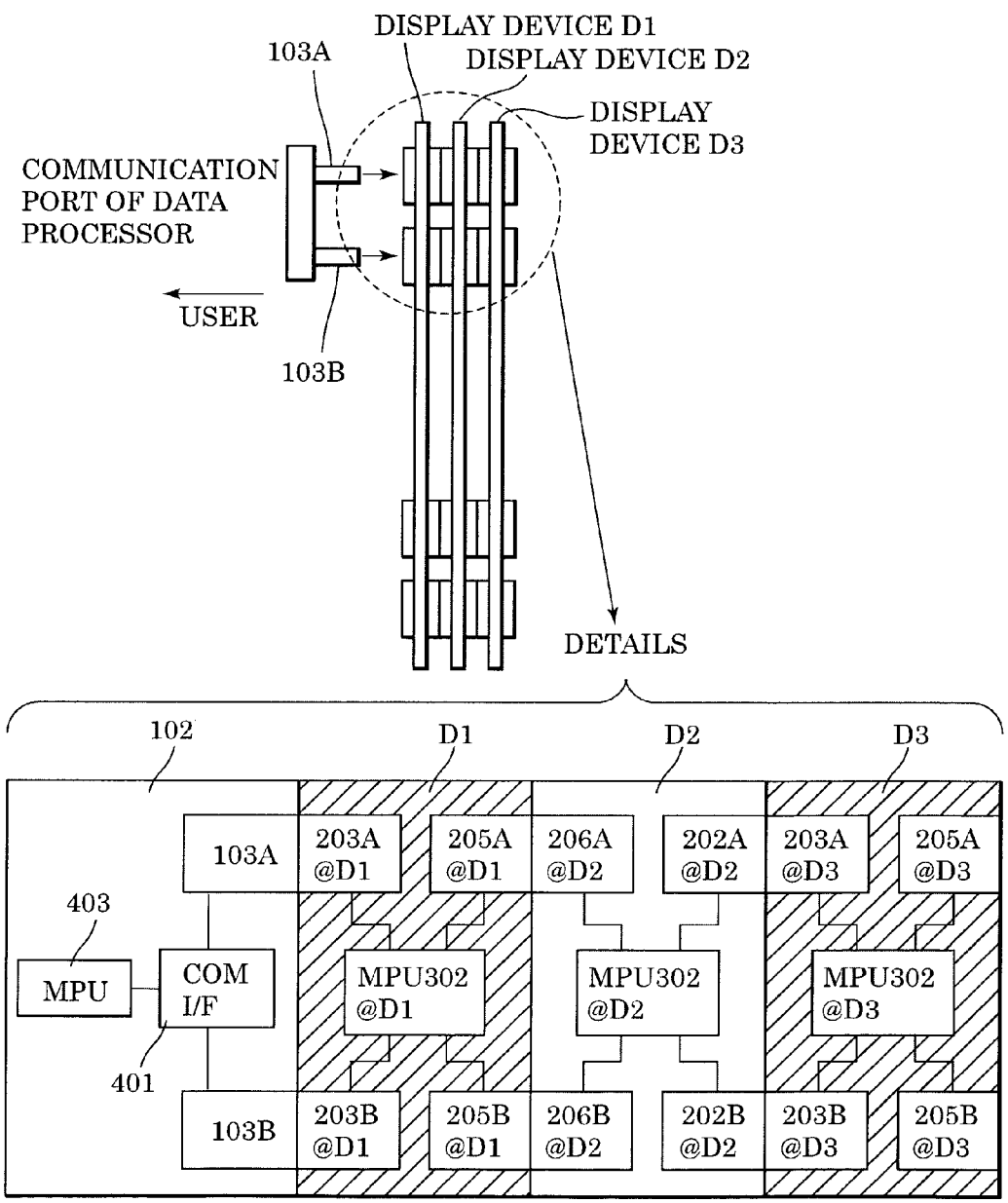
FIG. 9 is a side view showing the connection of a plurality of display devices.

Then, the user stacks three display devices D1, D2, and D3, each having the same configuration as that of the display device 100. In a state where a document is displayed in the top display device (D1, for example), the user sandwiches the right shoulder of the display devices by the data processor 102. Herein, three display devices having the same configuration as that of the display device 100 are stacked, but the present invention is not limited by the number of display devices. FIG. 9 is a side view showing a state where the facing communication ports of the stacked three display devices D1 to D3 are connected to each other.

The content displayed in the display device specified by the user is copied to the other two display devices by a predetermined operation.

Figure 10:
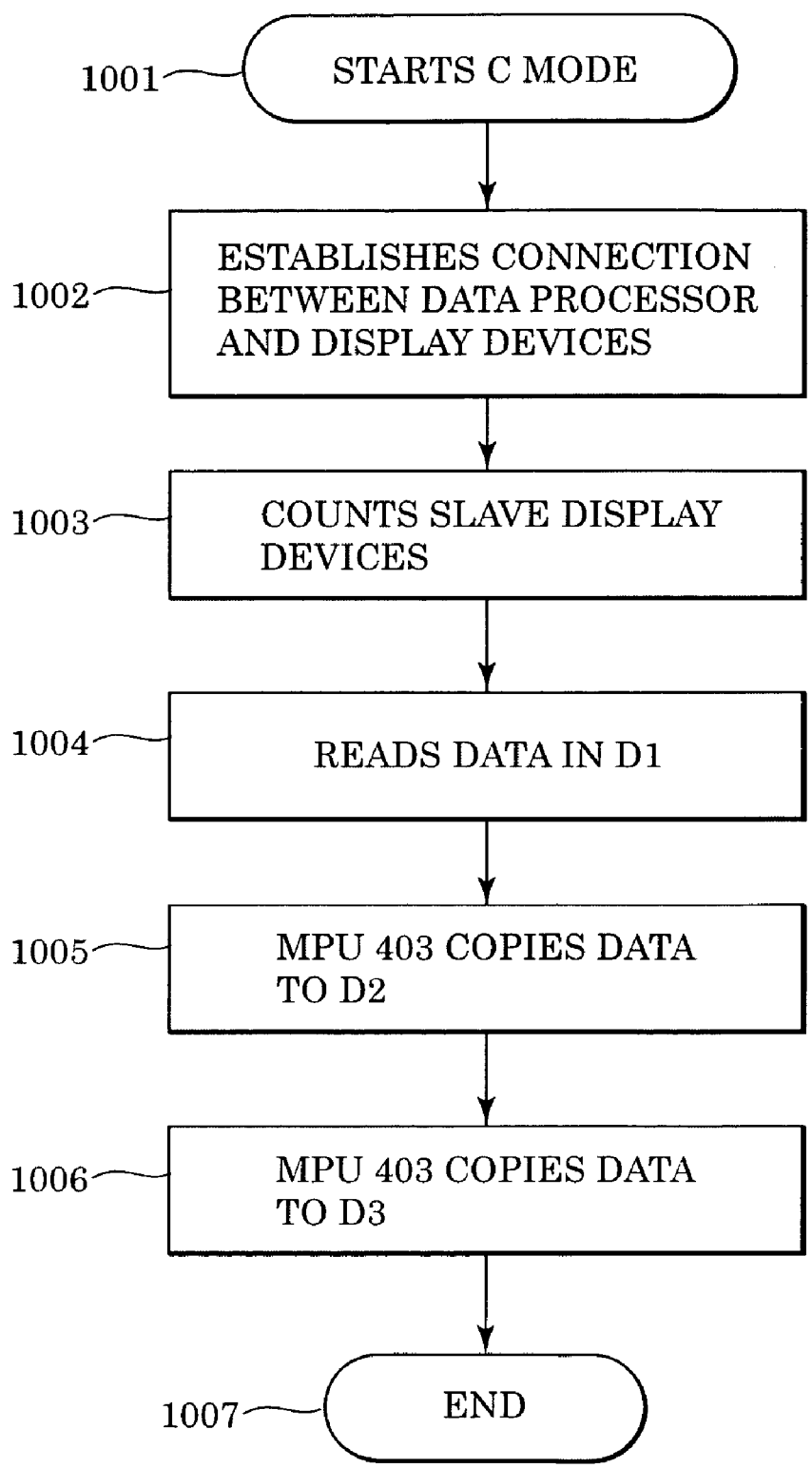
FIG. 10 is a flowchart of a copy mode according to an embodiment of the present invention.

FIG. 10 is a flowchart illustrating an operation of the data processor 102 in the copy mode. A program corresponding to this operation is stored in the FROM 406 and is executed by the MPU 403.

First, the MPU 403 detects that the mode selector switch 108 of the UI 402 has been set at position C and starts the copy mode (1001). The user rotates the operation dial 104 so as to select a display device as a source by referring to the LCD 105. In this case, the display device D1, which is at the top of the stacked display devices, is selected.

As in step 604 of the first embodiment, the connection between the data processor 102 and the display devices D1 to D3 is established (1002). By folding the data processor 102 as in the first embodiment, the MPU 403 starts communication as in step 604.

The MPU 403 of the data processor 102 detects and counts the number of stacked display devices (slaves) in step 1003. First, the MPU 403 communicates with the MPU 302 of the display device D1 (hereinafter referred to as MPU302@D1). The MPU 403 transmits an end-search-request message MSG_FE and a connection number MSG_CO=1 to the MPU302@D1.

The MPU302@D1 operates in the following way in response to this message.

Operation 1)

Upon receiving MSG_FE and MSG_CO through a specific communication channel, the MPU302@D1 tries to communicate with another display device by using a communication channel at the back side of this communication channel. If another display device is detected, the MPU302@D1 stores the value of MSG_CO in the internal register, adds 1 thereto, and transmits it. Upon receiving MSG_FE, the MPU302@D1 recognizes the channel used for reception as COH (channel on the data processor side) and the channel on the opposite side as COS (channel on the display device side), and stores the channel numbers in the internal register.

Operation 2)

If another display device cannot be detected in operation 1, the MPU302@D1 substitutes MSG_CO into MSG_SCE, which indicates the end of connection of slaves, and transmits it through the communication channel COH.

Operation 3)

If the MPU302@D1 has received MSG_SCE from the communication channel COS, the MPU302@D1 transfers the MSG_SCE to the communication channel COH at the back side of the receiving channel.

After these operations, the MPU302@D1 transmits MSG_FE and the connection number MSG_CO=2 to the display device D2 through channel 5 (=COS) at the back side of channel 3 (=COH), which has established the communication with the MPU 403. At this moment, the MPU302@D1 recognizes that the display device D1 is at the nearest position of the data processor 102, and stores MSG_CO=1 in the internal register of the MPU302@D1. Also, COH=3 and COS=5 are stored.

The MPU302@D2 receives the MSG_FE message from the MPU302@D1 and detects the display device D3 connected through channel 2 (=COS) at the backside of channel 6 (=COH), which has established communication with the MPU302@D1. Then, the MPU302@D2 stores MSG_CO=2, COH=6, and COS=2 in its internal register and transmits MSG_CO=3 and MSG_FE to the MPU302@D3.

The MPU302@D3 cannot detect a display device connected through channel 5. Therefore, according to the above-described operation 2, the MPU302@D3 substitutes MSG_CO=3 to the message MSG_SCE and transmits the message to the MPU302@D2 through channel 3. The message MSG_SCE is transmitted to the data processor 102 through the MPU302@D2 and the MPU302@D1.

The data processor 102 receives MSG_CO=3 and detects that the three display devices D1 to D3 (slaves) are connected thereto.

The data processor 102 controls the display devices D1 and D2 so as to copy the contents displayed in the display device D1 to the display device D2 (1004). Specifically, the MPU 403 transfers the source data in the display device, which was selected by the user in the data processor 102 in step 1001, to the FROM 406. In this case, the display device D1 at the top was selected by the user.

The MPU 403 transmits an image-data-request message MSG_GET and a copy source number MSG_CPF=1 to the MPU302@D1. Accordingly, the MPU 302 of each of the display devices D1 to D3 operates in the following manner.

Operation 1)

Upon receiving the message MSG_GET, the MPU 302 compares MSG_CPF, which is received at relatively the same time and MSG_CO, which was stored in the register in step 1003. If MSG_CO is equal to MSG_CPF, the MPU 302 transmits the value of COH and the data in the VRAM 303 through the COH communication channel. After transmitting the data, the MPU 302 transmits a transmission end message MSG_SE to COH.

Operation 2)

The MPU 302 of the display device which does not satisfy the condition of operation 1 transfers the entire data that is transmitted just after MSG_GET from the communication channel COS to COH. Also, the MPU 302 transfers the transmission end message MSG_SE from the communication channel COS to COH.

According to the above-described operations 1 and 2, the MPU302@D1 determines that the display device D1 is a copy source because MSG_CPF=MSG_CO=1, and then transmits the data stored in the VRAM303@D1.

The MPU 403 uses the value of COH received before the data so as to perform a copy operation as in step 609 in the first embodiment. Herein, the data in area F in FIG. 8 is copied to the area starting from IAD1 in the FROM 406 (FIG. 7), and the data in area R is copied to the area starting from IAD2.

The MPU 403 of the data processor 102 stores the data recorded in the FROM 406 in step 1004 in the display device D2 (1005). First, the MPU 403 obtains COH of the display device D2, and then transfers the data based on the COH value.

That is, when COH=3, the MPU 403 copies the data starting from IAD1 in the FROM 406 to area F in the VRAM 303 of the display device D2 (hereinafter referred to as VRAM303@D2) and copies the data starting from IAD2 to area R.

When COH=2, the MPU 403 copies the data starting from IAD1 in the FROM 406 to area F in the VRAM303@D2 with a 180-degree turn, and copies the data starting from IAD2 to area R with a 180-degree turn.

When COH=7, the MPU 403 copies the data starting from IAD1 in the FROM 406 to area R in the VRFAM303@D2 and copies the data starting from IAD2 to area F.

When COH=6, the MPU 403 copies the data starting from IAD1 in the FROM 406 to area R in the VRAM303@D2 with a 180-degree turn, and copies the data starting from IAD2 to area F with a 180-degree turn.

By copying the data in the above-described manner, the user can view a positionally correct image regardless of the original front/back surfaces and upper/lower sides of the display device D2. Accordingly, copied data can be seen in a correct orientation regardless of the direction of the display device, whereas the user has to rotate paper so as to change the direction of document in the known method using paper.

Then, the MPU 403 of the data processor 102 stores the data recorded in the FROM 406 in step 1004 in the display device D3 (1006). Specifically, the MPU 403 obtains COH of the display device D3 and then transfers the data according to the value of COH.

When COH=3, the MPU 403 copies the data starting from IAD1 in the FROM 406 to area F in the VRAM303@D3 and copies the data starting from IAD2 to area R. When COH=2, the MPU 403 copies the data starting from IAD1 in the FROM 406 to area F in the VRAM303@D3 with a 180-degree turn, and copies the data starting from IAD2 to area R with a 180-degree turn.

When COH=7, the MPU 403 copies the data starting from IAD1 in the FROM 406 to area R in the VRAM303@D3 and copies the data starting from IAD2 to area F.

When COH=6, the MPU 403 copies the data starting from IAD1 in the FROM 406 to area R in the VRAM303@D3 with a 180-degree turn, and copies the data starting from IAD2 to area F with a 180-degree turn.

After that, the copy mode is completed (1007).

By performing the above-described copy operation, the data is copied so that the user can view a positionally correct image regardless of the original front/back surfaces and upper/lower sides of the display device D3.

Next, the erasing mode will be explained. In the erasing mode, the user can erase the data displayed in all the displays. The operation of the erasing mode is now described below.

First, the user sets the mode selector switch 108 of the data processor 102 to the E mode (erasing mode). Then, the user stacks the three display devices D1 to D3 and sandwiches the right shoulder thereof by the data processor 102. In the erasing mode, the direction of image displayed in each display device and the front/back surfaces can be ignored.

The operation program for the erasing mode is stored in the FROM 406 in advance, and is executed by the MPU 403 as follows.

When the erasing mode is specified by the user, the MPU 403 of the data processor 102 performs the operation of step 1003 so as to detect the end of connected slave devices, and then transmits an erasing message MSG_ER.

In response to this message, the MPU 302 of each of the display devices D1 to D3 operates in the following manner.

Operation 1)

Upon receiving MSG_ER through the COH communication channel, the MPU 302 transfers MSG_ER to the COS communication channel. If no connected party is detected through the COS communication channel, that is, if the display device is at the end of connection, no operation is performed.

Operation 2)

Upon receiving MSG_ER through the COH communication channel, the MPU 302 erases the data stored in the VRAM 303. Then, the MPU 302 waits for MSG_ERF (described later), which will be transmitted through the COS communication channel. The received MSG_ERF is transmitted through the COH communication channel.

Operation 3)

After the display device at the end of connection has erased the data stored in the VRAM 303, the display device transmits an erasing finish message MSG_ERF through the COH communication channel.

According to the above-described operations, the erasing message MSG_ER issued by the MPU 403 of the data processor 102 is transmitted to the MPU302@D1, MPU302@D2, and MPU302@D3. Then, each of the MPU302@D1, MPU302@D2, and MPU302@D3 erases the data stored in the VRAM 303. The MPU302@D3, which is at the end of connection, transmits MSG_ERF through the COH communication channel after erasing the data stored in the VRAM 303. The message MSG_ERF is transmitted to the MPU 403 of the data processor 102 through the MPU302@D2 and the MPU302@D1. Accordingly, the MPU 403 of the data processor 102 detects that the data displayed in the display devices D1 to D3 has been erased.

In the sort mode, the user can sort pieces of data displayed in the stacked display devices according to page number. On the other hand, in the random mode, the user can randomly sort pieces of recorded data according to page number. However, the upper/lower side is properly directed.

The user operates the mode selector switch 108 of the data processor 102 so as to set the switch to the S mode (sort mode) or the R mode (random mode). Then, the user stacks all the display devices D1 to D3 for displaying the pieces of data which are to be sorted or shuffled and sandwiches the right shoulder thereof by the data processor 102. Herein, three display devices are stacked, but the present invention is not limited by the number of display devices. The communication ports of the three stacked display devices D1 to D3 are connected to each other as shown in FIG. 9. The pieces of data in the display devices D1 to D3 are sorted according to page number or shuffled according to the procedure which will be described later. If the front/back sides or upper/lower sides of images are reversed, the direction is corrected.

Figure 11:
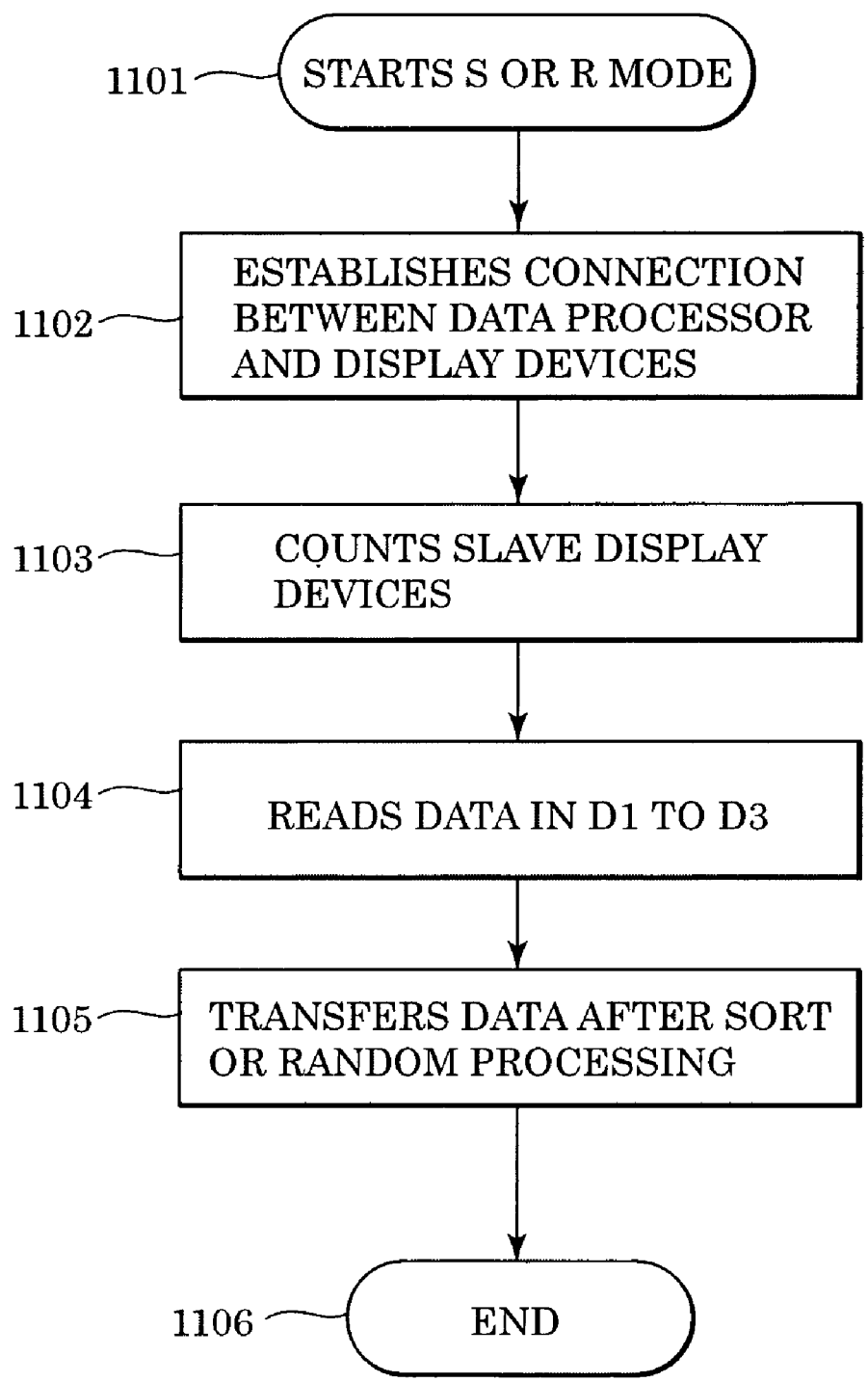
FIG. 11 is a flowchart of a sort mode and a random mode according to an embodiment of the present invention.

FIG. 11 is a flowchart illustrating the operation in the sort mode and the random mode. Herein, image data is recorded in the recording area VRAM 303 of each of the display devices D1 to D3. Also, DATB (FIG. 7) corresponding to the image data is recorded in the RAM included in the MPU 302 of each of the display devices D1 to D3. The operation program for the MPU 403 corresponding to FIG. 11 is recorded in the FROM 406, and the MPU 403 operates in the following way according to this program.

The MPU 403 detects that the mode selector switch 108 of the UI 402 has been set at position S and starts the sort mode (1101).

As in step 604 in the first embodiment, the connection between the data processor 102 and the display devices D1 to D3 is established (1102). By folding the data processor 102, the MPU 403 starts communication with the display devices D1 to D3 as in step 604.

Then, the MPU 403 of the data processor 102 detects the number of stacked display devices as in the operation of step 1003 of the copy mode (1103).

Figure 12:
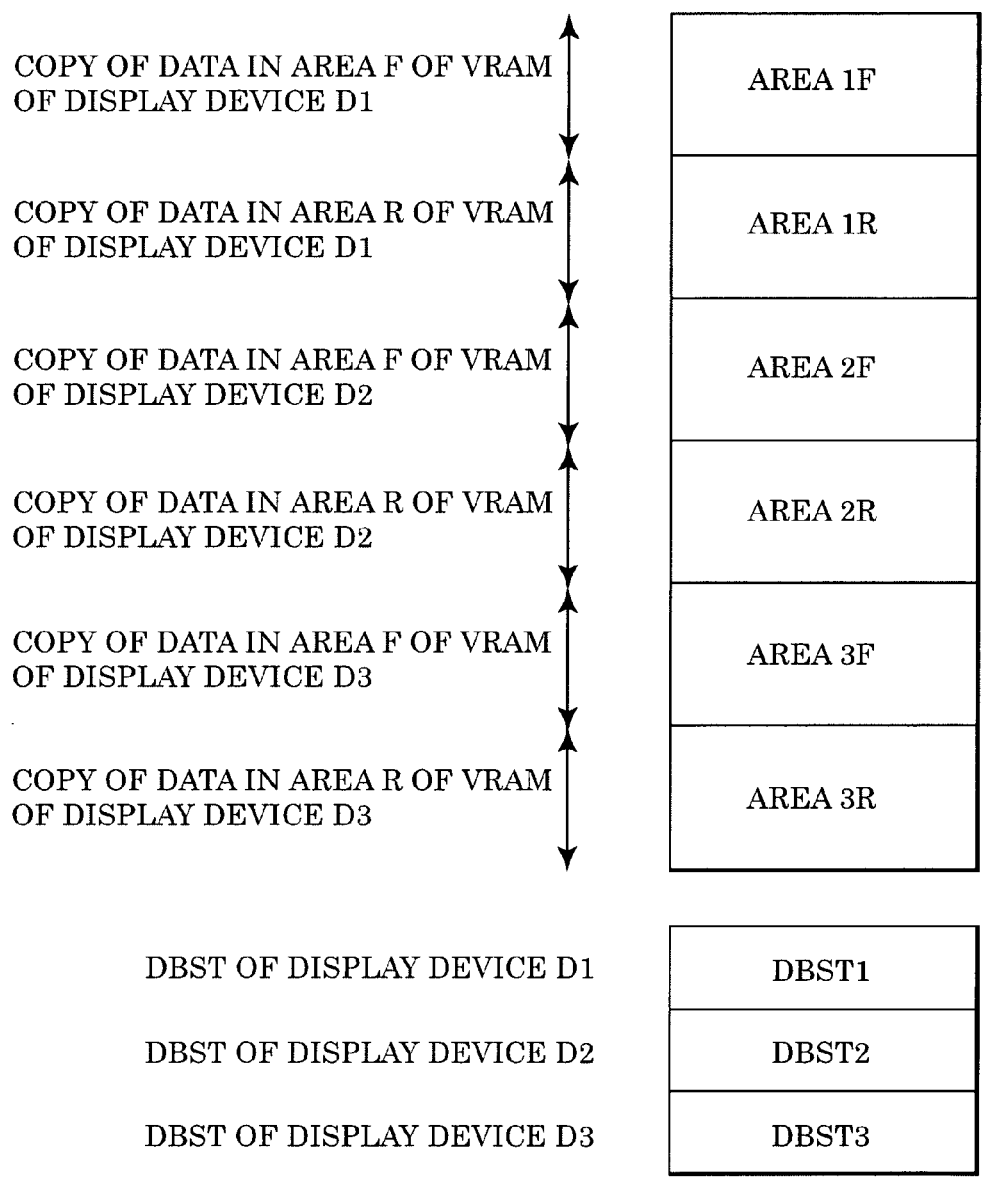
FIG. 12 is a memory map of the FROM according to a second embodiment of the present invention.

The MPU 403 transfers the data in the VRAM 303 of each of the display devices D1 to D3 to the FROM 406 (1104). Before transferring the data, the MPU 403 obtains COH and DATB recorded in the internal RAM of the MPU 302 of each of the display devices D1 to D3. FIG. 12 shows the memory map of the FROM 406 at this time. The correspondence between the data area of the VRAM 303 of each of the display devices D1 to D3 and the data area of the FROM 406, and the storage of DATB are shown in FIG. 12.

FIG. 13 shows the values of CDT and COH included in DATB and the transfer destinations of data in area F and area R. By transferring data according to the correspondence shown in FIG. 13, images are stored in the FROM 406 in a correct directional orientation recorded in the W mode of the first embodiment.

In the sort mode, the MPU 403 sorts pieces of data based on DID data and DPN data in each DATB stored in the FROM 406 (1105). DID data indicates a document number, and the pieces of data having the same DID data belong to the same document.

DPN data indicates the page number of a document. For example, assume that DATB1 recorded in the display device D1 says DID=1397 and DPN=2, that DATB2 recorded in the display devices D2 says DID=6249 and DPN=1, and that DATB3 recorded in the display device D3 says DID=1397 and DPN=1.

In the sort mode, the MPU 403 sorts pieces of data. Then, the MPU 403 updates the data in the display device D1 by the data in the display device D3 recorded in the FROM 406, updates the data in the display device D3 by the data in the display device D2 recorded in the FROM 406, and updates the data in the display device D2 by the data in the display device D1 recorded in the FROM 406.

Accordingly, the pieces of data are stored in order in the display devices D1 to D3, and the data is displayed in the correct directional orientation.

In the random mode, a transfer destination of data is decided according to a predetermined random number sequence, instead of sorting pieces of data.

FIG. 14 shows an example of transfer to each of the display devices D1 to D3 according to the value of COH.

Then, the sort mode or the shuffle mode is completed (1106).

In the above-described embodiments, each display device includes a plurality of communication ports which can be connected to the data processor; a unit which notifies the data processor of the communication port used for the communication with the data processor; and a unit which stores and notifies the recognition number of the communication port used for recording data. With this configuration, the data processor can know the contents displayed in the display device and its direction, such as upper/lower sides and front/back sides, and can perform data processing operations such as copy, sort, and shuffle operations. Accordingly, pages of electronic data can be easily copied, sorted, or shuffled by user's operation, which is more efficient than sorting physical sheets of paper, so that the efficiency of conventional paperwork can be enhanced.

Since the data processor includes the communication unit 107 which communicates with computers or recording media other than the display devices, data to be displayed can be transferred from a general-purpose computer to the data processor, and also backup and sort of data can be electrically performed. Accordingly, the conventional paperwork using a copier and a document scanner can be improved in efficiently and the cost can be reduced.

OTHER EMBODIMENT

The object of the present invention can also be achieved by providing a storage medium storing program codes for performing the aforesaid processes to an image sensing system or device, reading the program codes, by a CPU or MPU of the image sensing system or device, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiments are realized by executing the program codes which are read by a CPU of the image sensing system or device, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the image sensing system or device or in a memory provided in a function expansion unit which is connected to the image sensing system or device, CPU or the like contained in the function expansion card or unit performs a part of entire process in accordance with designations of the program codes and realizes functions of the above embodiments.

In a case where the present invention is applied to the aforesaid storage medium, the storage medium stores program codes corresponding to the flowchart of FIG. 6 or 11 described in the embodiments.

The present invention is not limited to the above embodiments and various changes and modifications can be made within the spirit and scope of the present invention. Therefore to apprise the public of the scope of the present invention, the following claims are made.

This application claims priority from Japanese Patent Application No. 2003-416734 filed Dec. 15, 2003, which is hereby incorporated by reference herein.

What is claimed is:

1. A display system comprising:
    a thin display device including a first communication unit disposed on a surface of the display device, an image memory, and a thin display unit which displays images stored in the image memory; and
    a data processor including an operation unit, a second communication unit which can be connected to the first communication unit of the display device, and a processing memory, the data processor being independent from the display device, and in response to a user's action to fold the data processor, the first communication unit and the second communication unit being connected to each other so that a connection therebetween is established, wherein, in a state where the data processor accesses a plurality of the display devices that are stacked via the first communication unit and the second communication unit, the data processor performs transfer of the processed data between the image memory of the display device and the processing memory of the data processor, in response to a user's action to sandwich the plurality of the display devices by folding the data processor, wherein the first communication unit comprises a plurality of connection units which can be connected to the second communication unit of the data processor, wherein the display device comprises a unit which notifies the data processor of a connection unit to be used for communication with the data processor among the plurality of connection units;

wherein the display device comprises a second unit which stores information for specifying a connection unit used for recording data in the image memory and which notifies the data processor of the information, and wherein the data processor processes image data to be transmitted to the display device according to the notification from the display device.

2. A display system according to claim 1, wherein the data processor comprises a third communication unit which is capable of communicating with another data processor or a recording medium.

3. A display system according to claim 1, wherein the data processor is capable of copying image data recorded in the image memory of one of the display devices specified by the user to the other one or more display devices.

4. A display system according to claim 1, wherein the data processor is capable of randomly rerecording image data stored in any of the display devices.

5. A display system according to claim 1,
wherein, in a state where the plurality of display devices are stacked, the data processor detects the order of the stacked display devices, reads data in the display device at the top, and rerecords the data in another display device in response to the user's action to sandwich the plurality of display devices by folding the data processor.

6. A display system according to claim 1,
wherein, in a state where the plurality of display devices are stacked, the data processor detects the order of the stacked display devices and sorts image data stored in each display device based on a predetermined order in response to the user's action to sandwich the plurality of display devices by folding the data processor.

7. A display system according to claim 1,
wherein, in a state where the plurality of display devices are stacked, the data processor is capable of erasing image data recorded in the plurality of display devices in response to the user s action to sandwich the plurality of display devices by folding the data processor.

8. A display method in a display system,
wherein a thin display device includes a first communication unit disposed on a surface of the display device, an image memory, and a display unit which displays images stored in the image memory; and a data processor including an operation unit, a second communication unit which can be connected to the first communication unit of the display device, and a memory, the data processor being independent from the display device, and in response to a user's action to fold the data processor, the first communication unit and the second communication unit being connected to each other so that a connection therebetween is established, wherein the first communication unit comprises a plurality of connection units which can be connected to the second communication unit of the data processor, wherein the display device comprises a unit which notifies the data processor of a connection unit to be used for communication with the data processor among the plurality of connection units;

wherein the display device comprises a second unit which stores information for specifying a connection unit used for recording data in the image memory and which notifies the data processor of the information, and wherein the data processor processes image data to be transmitted to the display device according to the notification from the display device, the display method comprising:
a sandwiching step in which a user sandwiches a plurality of the display devices by folding the data processor, the plurality of display devices being stacked via the first communication unit and the second communication unit; and
a transfer step of transferring data which has been processed, between the image memory of the display device and the processing memory of the data processor in response to a user s action to sandwich the plurality of display devices by folding the data processor.

9. A display system comprising:
a thin display means for displaying information, said display means including a first communication unit disposed on a surface of the display device, an image memory, and a display unit which displays images stored in the image memory; and
a data processing means including an operation unit, a second communication unit which can be connected to the first communication unit of the display means, and a processing memory, the data processing means being independent from the display means, and in response to a user's action to fold the data processing means, the first communication unit and the second communication unit being connected to each other so that a connection therebetween is established, wherein, in a state where the data processing means accesses a display via the first communication unit and the second communication unit in response to the user's action to sandwich the display means by folding said data processing means, the data processing means performs transfers of the processed data between the image memory of the display means and the processing memory of the data processing means in response to the user's action to sandwich the display means by folding the data processing means, wherein the first communication unit comprises a plurality of connection units which can be connected to the second communication unit of the data processing means, wherein the display means comprises a unit which notifies the data processing means of a connection unit to be used for communication with the data processing means among the plurality of connection units; and wherein the display means comprises a second unit which stores information for specifying a connection unit used for recording data in the image memory and which notifies the data processing means of the information, and wherein the data processing means processes image data to be transmitted to the display means according to the notification from the display means.

* * * * *